June 17, 1969 J. A. FAVRE 3,450,423
SWIVEL CONDUIT COUPLING
Original Filed May 23, 1963
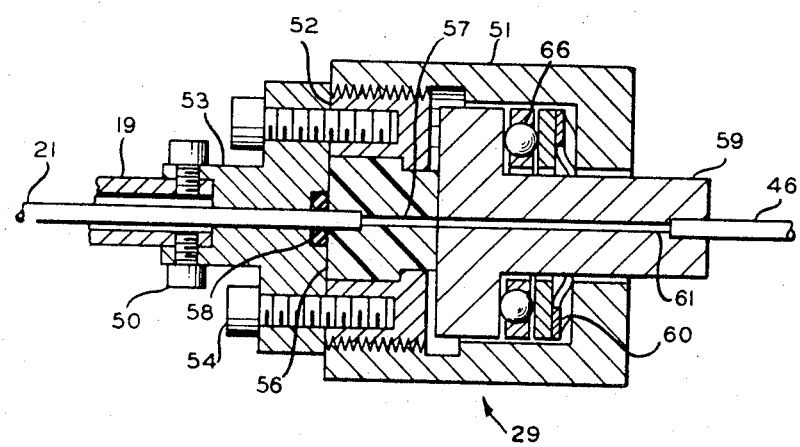
INVENTOR.
J. A. FAVRE
BY
ATTORNEYS

United States Patent Office 3,450,423
Patented June 17, 1969

3,450,423
SWIVEL CONDUIT COUPLING
John A. Favre, Bartlesville, Okla., assignor to Phillips Petroleum Company, a corporation of Delaware
Original application May 23, 1963, Ser. No. 282,672, now Patent No. 3,306,347, dated Feb. 28, 1967. Divided and this application Dec. 29, 1966, Ser. No. 605,900
Int. Cl. F16l 27/00
U.S. Cl. 285—169                 4 Claims

ABSTRACT OF THE DISCLOSURE

An apparatus for connecting two conduits having a first connecting member and a second resilient connecting member, both connecting members having channels extending therethrough which in turn communicate with fluid conduits. The first connecting member is held against the second resilient connecting member by a spring so that the channels are in direct communication and is enclosed by a rotating case member which is in turn connected to a sleeve around a second resilient connecting member to thereby connect the conduits in communication with the said channels.

---

This is a division of application Ser. No. 282,672, filed May 23, 1963, now Patent No. 3,306,347

This invention relates to coupling devices. In another aspect, this invention relates to a novel apparatus for coupling two conduits in axial alignment.

My copending application referred to above discloses a novel method of and apparatus for trapping and storing vaporous components. When utilizing the above disclosed apparatus, it is necessary that non-rotatable fluid conduits communicating therewith be connected and sealed in an effective manner so that none of the fluid flowing therethrough is lost at the point of connection.

Therefore, one object of this invention is to provide a novel apparatus for coupling fluid conduits.

Another object of this invention is to provide a novel apparatus for coupling a rotatable and a non-rotatable fluid conduit.

A further object of this invention is to provide a novel apparatus for coupling two non-rotatable fluid conduits.

According to this invention, an apparatus for connecting two fluid conduits is provided comprising first and second connecting members having first and second channels extending respectively therethrough, said second connecting member being contained within a sleeve, said sleeve being connected to said first connecting member by a rotatable case which also encloses said first connecting member, and said first connecting member being forced against said second connecting member by a spring member.

The apparatus of this invention can be utilized in coupling any two fluid conduits in axial alignment; however, this invention will be illustrated as coupling fluid conduits in the apparatus disclosed in the above-mentioned copending application.

The drawing shows a cross sectional view of the coupling apparatus of this invention.

Referring now to the drawing, a coupling device 29 is attached to shaft 19 by threaded screw members 50 extending through closure members 53 and into shaft 19. A threaded outer case member 51 threadably engages inner sleeve member 52, and sleeve member 52 is attached to closure member 53 by threaded screw members 54. Positioned within sleeve member 52 is a connecting member 56, preferably fabricated for reasons hereinafter apparent from a plastic material such as Teflon (tetrafluoroethylene), manufactured by E. I. du Pont de Nemours Company of Wilmington, Delaware, while the remaining coupling device 29 part members are preferably metallic, except as hereinafter otherwise described.

Conduit 21 extends through shaft 19, closure member 53 and into connecting member 56 wherein said conduit 21 is in communication with a channel 57 positioned within connecting member 56. To prevent the leakage of vapors from channel 57, a sealing member 58 such as a Parker O-ring manufactured by Parker Seal Company of Culver City, California, is positioned immediately adjacent to connecting member 56 and surrounding conduit 21.

A second connecting member 59 is positioned adjacent to and in constant contact with connecting member 56. A spring member 60, such as a Halogen wave spring, manufactured by Halogen Insulator and Seal Corporation, Franklin Park, Illinois. acting against connecting member 59 continuously maintains contact between connecting members 56 and 59. Channel 61 extending through connecting member 59 is in communication with channel 57 and conduit 46.

In operation, outer case member 51, sleeve member 52, closure member 53 and connecting member 56 rotate with the rotation of shaft 19. Connecting member 59 and conduit 46 do not rotate, thereby providing a means for transmitting vapors from the rotating conduit means to a stationary conduit means. Bearing 66 provides for ease of motion by reducing friction and wear between rotating and nonrotating parts.

As will be evident to those skilled in the art, various modifications may be made or followed in view of the foregoing disclosure and discussion without departing from the spirit or scope thereof.

I claim:
1. An apparatus comprising a first connecting member of a plastic material having a first channel extending therethrough; a second connecting member, adjacent and radially engaging said first connecting member, comprising a cylinder having a second channel extending axially therethrough and having a pressure flange extending along the periphery thereof adjacent said first connecting member, said first and second channels being in direct communication; a ball bearing means engaging the side of the pressuree flange of said second connecting member opposite said first connecting member; a holding means comprising a sleeve member positioned about and adjacent said first connecting means and a closure member having a third channel extending therethrough, said closure member positioned adjacent said first connecting member and connected to said sleeve member so that said first and said third channels are in direct communication; a rotatable case member, positioned about said second connecting member and at least a portion of said holding means, comprising a cylinder with one open end having means on the inside periphery of said open end to connect with said sleeve member of said holding means, and an opening to the closed end thereof for receiving said second connecting member; a spring member positioned around the periphery of a portion of said second connecting member and exerting force between said ball bearing means and the closed end of said rotatable case member so as to maintain continuous communication between said first and second channels; a sealing means positioned around said third channel adjacent the point of connection between said first channel and said third channel; first conduit means operably connected to and positioned axially with the end of said second channel opposite said first connecting means; and second conduit means operably connected to and positioned axially with the end of said third channel opposite said first connecting means and extending through said third chan- nel means and said sealing means into said first channel means.

2. An apparatus comprising a first connecting member having a first channel extending therethrough; a second connecting member, adjacent and radially engaging said first connecting member, comprising a cylinder having a second channel extending axially therethrough and having a pressure flange extending along the periphery thereof adjacent said first connecting member, said first and second channels being in direct communication; bearing means engaging said second connecting member; a holding means comprising a sleeve member positioned about and adjacent said first connecting means and a closure member having a third channel extending therethrough, said closure member being positioned adjacent said first connecting member and connected to said sleeve member so that said first and said third channels are in direct communication; a rotatable case member, positioned about said second connecting member and at least a portion of said holding means, comprising a cylinder with one open end having means on the inside periphery of said open end to connect with said sleeve member of said holding means, and an opening to the closed end thereof for receiving said second connecting member; a spring member positioned around the periphery of a portion of said second connecting member and exerting force upon said second connecting member so as to maintain continuous communication between said first and second channels; and sealing means positioned around said third channel adjacent the point of connection between said first and said third channels.

3. The apparatus of claim 2 further comprising a first conduit connected to the end of said second channel opposite said first connecting means, and second conduit means connected to the end of said third channel positioned opposite said first connecting means.

4. The apparatus of claim 3 wherein said second conduit means extends through said third channel means and said sealing means into said first channel means.

References Cited

UNITED STATES PATENTS

| | | | |
|---|---|---|---|
| 1,930,833 | 10/1933 | Barrett | 285—281 |
| 2,587,170 | 2/1952 | Klingler et al. | 285—279 |
| 3,057,646 | 10/1962 | Brumagim | 285—134 X |
| 3,058,761 | 10/1962 | Christophersen | 285—281 |

THOMAS F. CALLAGHAN, *Primary Examiner.*

U.S. Cl. X.R.

285—279, 281